United States Patent
Eashwaramoorthy

(10) Patent No.: US 10,841,746 B2
(45) Date of Patent: Nov. 17, 2020

(54) GROUP TRAVEL AND MAP INTEGRATION TOOL FOR ONLINE AND OFFLINE CONNECTIVITY AND LOCATION TRACKING IN REAL TIME

(71) Applicant: UST Global (Singapore) Pte. Ltd., Singapore (SG)

(72) Inventor: Prasad Vignesh Eashwaramoorthy, Trivandrum (IN)

(73) Assignee: UST GLOBAL (SINGAPORE) PTE. LTD., Singapore (SG)

(*) Notice: Subject to any disclaimer, the term of this patent is extended or adjusted under 35 U.S.C. 154(b) by 0 days.

(21) Appl. No.: 16/119,597

(22) Filed: Aug. 31, 2018

(65) Prior Publication Data
US 2019/0380005 A1 Dec. 12, 2019

(30) Foreign Application Priority Data
Jun. 7, 2018 (IN) .............................. 201811021381

(51) Int. Cl.
*H04W 4/029* (2018.01)
*H04W 4/46* (2018.01)

(52) U.S. Cl.
CPC ............. *H04W 4/029* (2018.02); *H04W 4/46* (2018.02)

(58) Field of Classification Search
CPC ......... H04W 4/029; H04W 4/46; H04W 4/80; H04W 40/244; H04W 48/16; H04W 4/02;
(Continued)

(56) References Cited

U.S. PATENT DOCUMENTS

| 9,455,758 B1* | 9/2016 | Roberts | H04B 1/3827 |
| 2005/0027442 A1* | 2/2005 | Kelley | G01C 21/343 |
| | | | 701/425 |

(Continued)

FOREIGN PATENT DOCUMENTS

| WO | WO 2012/104725 A2 | 8/2012 | |
| WO | WO-2012104725 A2 * | 8/2012 | ............ H04W 76/00 |

OTHER PUBLICATIONS

Using the SX1280/SX1281 in Low Power Applications; SEMTECH, August (Year: 2018).*
(Continued)

*Primary Examiner* — Nathan S Taylor
(74) *Attorney, Agent, or Firm* — Nixon Peabody LLP

(57) ABSTRACT

A system and method for maintaining private communication between groups of travelers travelling to the same destination. The method is achieved using a navigation module working with an infotainment device such as mobile phone/vehicle dashboard. The navigation module includes a long range, low power transceiver, a positioning transceiver, a Bluetooth wireless transceiver and a network communication transceiver. Each traveler has a navigation module. The method dynamically hosts an instance of the cloud for a connected group. The group leader can create a private travel group and the group is connected using both the cloud a long range, low power RF network. The method helps the group to interact among themselves by sharing their live positions, and responses such as alerts or chats. The group remains connected while the network communication transceiver is active (online) and while long range, low power RF network is active (offline).

13 Claims, 5 Drawing Sheets

(58) Field of Classification Search
CPC ..... H04W 4/021; H04W 4/023; H04W 72/02; H04W 72/042; H04W 72/0446; H04W 76/14; H04W 84/18; H04W 88/04; H04W 88/16; H04W 28/06; H04W 4/12; H04W 4/14; H04W 4/20; H04W 4/35; H04W 4/38; H04W 52/245; H04W 56/0015; H04W 64/00
USPC ...... 455/456–457, 41.2, 575.8; 370/336, 311
See application file for complete search history.

(56) References Cited

U.S. PATENT DOCUMENTS

| | | | | |
|---|---|---|---|---|
| 2007/0149208 | A1* | 6/2007 | Syrbe | H04W 4/024 455/456.1 |
| 2009/0098883 | A1* | 4/2009 | Yoon | H04M 1/72572 455/456.1 |
| 2009/0204265 | A1* | 8/2009 | Hackett | G05B 19/4185 700/284 |
| 2011/0111700 | A1* | 5/2011 | Hackett | A01G 25/16 455/41.2 |
| 2011/0176464 | A1* | 7/2011 | Warner | H04B 1/713 370/311 |
| 2011/0288728 | A1* | 11/2011 | Ruizenaar | G01C 21/28 701/41 |
| 2012/0087350 | A1* | 4/2012 | Norair | H04B 7/2656 370/336 |
| 2012/0202428 | A1* | 8/2012 | Mirbaha | H04L 12/185 455/41.2 |
| 2013/0017788 | A1* | 1/2013 | Norair | H04M 1/0254 455/41.2 |
| 2013/0094538 | A1* | 4/2013 | Wang | H04B 1/707 375/141 |
| 2013/0340305 | A1* | 12/2013 | Mobley | A01K 29/005 40/300 |
| 2016/0261306 | A1* | 9/2016 | Seller | H04W 56/0015 |
| 2016/0345265 | A1* | 11/2016 | Lee | H04W 52/0235 |
| 2017/0039661 | A1* | 2/2017 | Vanslette | G06Q 50/163 |
| 2017/0178064 | A1* | 6/2017 | Olejak | G06Q 10/087 |
| 2017/0181033 | A1* | 6/2017 | Jones | H04W 28/06 |
| 2017/0245108 | A1* | 8/2017 | Slater | H04W 4/021 |
| 2018/0139274 | A1* | 5/2018 | Gandhi | H04L 67/1046 |
| 2018/0183875 | A1* | 6/2018 | Liu | H04W 4/70 |
| 2018/0199172 | A1* | 7/2018 | Boily | H04W 88/04 |
| 2018/0218619 | A1* | 8/2018 | Brown | H04B 7/18506 |
| 2018/0367872 | A1* | 12/2018 | Lucrecio | H04Q 9/00 |
| 2019/0012745 | A1* | 1/2019 | Ampe | G06Q 40/123 |
| 2019/0037362 | A1* | 1/2019 | Nogueira-Nine | H04W 4/029 |
| 2019/0041531 | A1* | 2/2019 | Schmotzer | H04W 4/46 |
| 2019/0209022 | A1* | 7/2019 | Sobol | A61B 5/0002 |

OTHER PUBLICATIONS

LoRa Alliance to Showcase IoT for Low Power, Long Range Networks at Mobile Congress Shanghai, Eric Lawson, Jun. 26, 2017 (Year: 2017).*

International Search Report and Written Opinion in International Patent Application No. PCT/IB2019/057364, dated Dec. 4, 2019 (11 pages).

LoRa Alliance; "LoRaWAN: What is it?: A technical overview of LoRa and LoRa WAN"; Jun. 2016 (20 pages).

Semtech; "What is LoRa?"; copyright 2020 (3 pages).

LoRa Alliance, Inc.; "LoRaWAN 1.1 Specification: Notice of Use and Disclosure"; 2017 (101 pages).

* cited by examiner

GROUP TRAVEL AND MAP INTEGRATION TOOL FOR ONLINE AND OFFLINE CONNECTIVITY AND LOCATION TRACKING IN REAL TIME

PRIORITY CLAIM

The present disclosure claims priority to Indian Provisional Application No. 201811021381, filed on Jun. 7, 2018. The contents of that application are hereby incorporated by reference in their entirety.

TECHNICAL FIELD

The present disclosure relates generally to a communication system between moving vehicles, and more specifically, to a method and system to integrate low frequency communication to coordinate the dynamic location of vehicles traveling together.

BACKGROUND

The current state of the art for group vehicular travel is that each individual or vehicle in the group follows a pre-determined route to a given destination. The individuals/vehicles are not connected with one another and cannot see their location along the route in relation to their fellow group members, the relative location of the destination, or the relative positions of themselves or any group members within a map context. Therefore, there is no group cohesion and no true group travel.

Presently there is no flexibility to change the route during the course of travel and communicate the change in real time to the entire group. There is also no way for other vehicles to easily know if the group leader has taken a route different than that agreed upon. There is also no known capability to determine if a member of the group has gone off the route or stopped for whatever reason. In event of emergency there is no way for all members of the group to be notified simultaneously.

Thus, in situations such as protection of a dignitary in a convoy, current systems do not allow ready communication between vehicles in a procession. For example, a dignitary may be visiting a remote location. The route map would be decided prior to the group travel. There may be 4 to 5 routes planned and only one route will be chosen. The lead car takes the route and other cars follow the lead car. Security may be compromised when terrain prevents radio based or other forms of conventional communication. Further, the members of the group cannot dynamically determine the location of other members should the procession become separated, thereby creating a security risk.

The common response to these challenges is using a cellphone or some other microphone/radio communications device to maintain communication between vehicles. Using cell phones themselves does not allow easy transmission of the location of different vehicles. There are certain navigation applications that may assist in location determination. For example, the WAZE on-line navigation product allows some communication of navigation data between travelers. WAZE is an open platform for any user. However, since WAZE is a cell phone application, it presupposes that connections may be made via conventional communications such as a cellular network. Further, WAZE is based on a common pool of travelers who are interconnected. Thus, the users of WAZE have no assurance of a common route or a common destination.

Thus, there is a need for a system that allows location communication between travelers who are travelling in a group. There is also a need for a system that allows establishing a network between travelers to maintain communication when conventional cellular signals are unavailable. There is a further need for a system that alerts members of a travelling group when one of the group fails to be connected. There is also a further need for a closed platform that allows only a closed group of members may see each other.

SUMMARY

One disclosed example is a system for maintaining communication between a first and second traveler. The system includes a first group navigation module in proximity to the first traveler. The first group navigation module includes a long range, low power transceiver, a positioning transceiver, and a network communication transceiver. The system includes a second group navigation module in proximity to the second traveler. The second group navigation module includes a long range, low power transceiver, a positioning transceiver, and a network communication transceiver. A long range, low power network is established through the long range low power transceivers, and position data from the positioning transceivers is exchanged via the long range, lower power transceivers.

Another disclosed example is a method of communication between a first group navigation device and a second group navigation device during procession of the devices to a destination. A low power, long range based network is established between the first and second group navigation devices via respective low power, long range transceivers. The position of each of the group navigation devices is determined. The position data associated with the position of group navigation device is sent to the other group navigation device via the low power, long range network.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1:
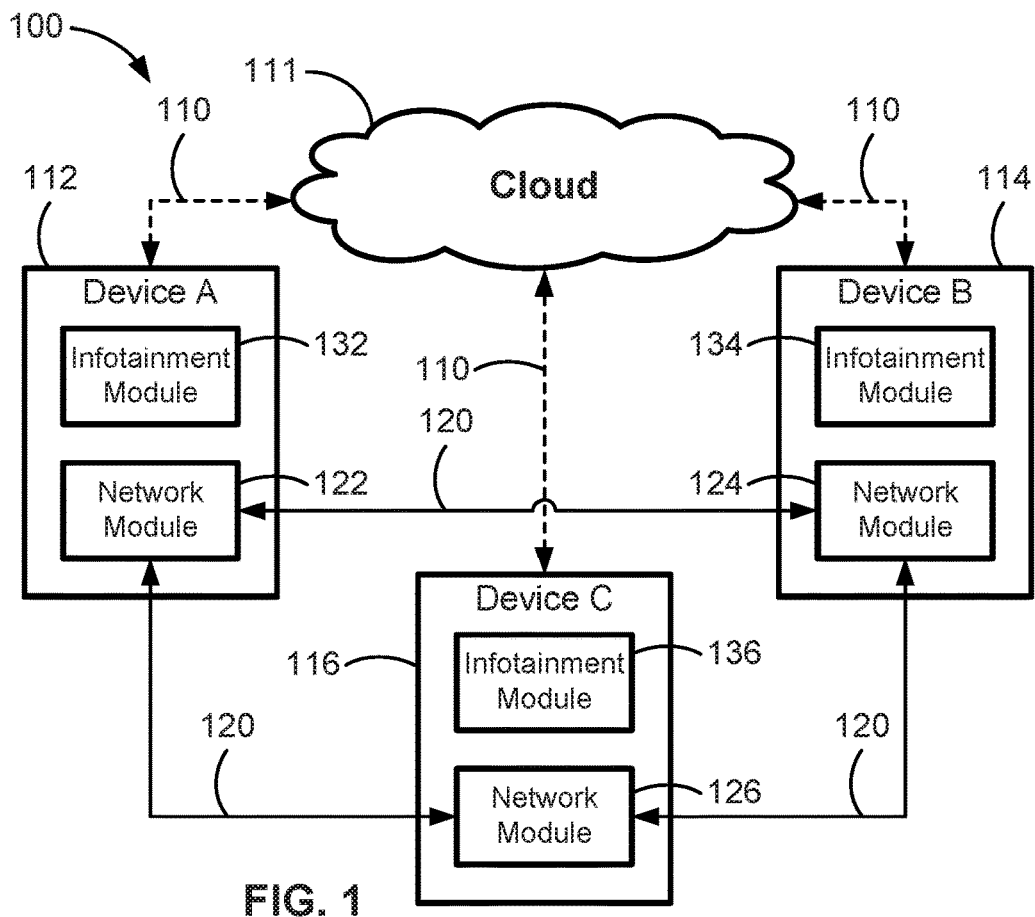
FIG. 1 is a block diagram of the example system that provides long range, low power communication in a network established between vehicles traveling a pre-planned route.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

FIG. 1 is a block diagram of an example system 100 that allows coordination between entities traveling together. The system 100 includes a wireless RF network 110 and the cloud 111. The network 110 allows communication between three example group navigation devices 112, 114, and 116 that are carried by travelers. In this example, the wireless network may be the Internet or a GSM network. The cloud 111 is the primary permanent storage of all three of the example group navigation devices 112, 114, and 116. In this example, each of the group navigation devices 112, 114, and 116 are in separate vehicles, such as motor vehicles like cars, trucks, busses, convoys, limousines, motorcycles, or the like. As will be explained, in this example, the vehicles are traveling together and rely on the group navigation devices 112, 114, and 116 to exchange real time location and route information.

Each of the group navigation devices 112, 114, and 116 has respective on-board long range, low power (LoRa) wireless network communication modules 122, 124, and 126. Each of the vehicles 112, 114, and 116 also include respective infotainment modules 132, 134, and 136. As will be explained below the infotainment modules 132, 134, and 136 communicate with each via a shared storage space, such as the cloud 111, which is accessed via the network 110. other through the network 110. In this example, the infotainment modules 132, 134, and 136 may access data on the cloud 111 and upload data to the cloud 111 using Internet connectivity provided by the GSM network or a broadband network. In this example, the infotainment modules 132, 134, and 136 communicate via the GSM network 110 to the cloud infrastructure instance 111. The LoRa network communication modules 122, 124, and 126 communicate directly with each other through a created private LoRa network 120. Details of the LoRa wireless data communication technology is available from Semtech, and the LoRa Alliance describes the requirements for LoRa and the corresponding Low Power Wide Area Network (LoRaWAN) specification, available at www.lora-alliance.org. Thus, the long range exceeds 10 km and the low power does not exceed 20 dBm.

Figure 2:
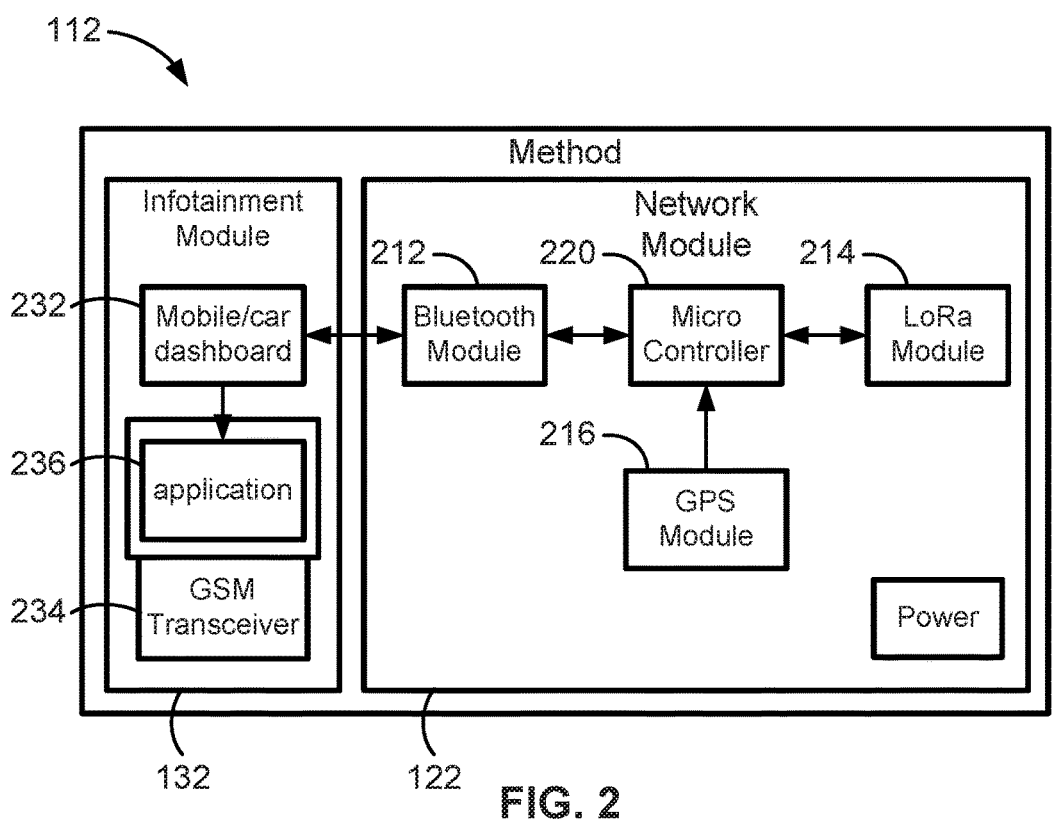
FIG. 2 is a block diagram of the vehicle device of the example system in FIG. 1.

FIG. 2 is a block diagram of one of the group navigation devices such as the group navigation device 112. In this example, the network module 122 is approximately the same size and dimension of a 5-inch mobile smart device, with an antenna. Of course other designs that reduce the size of the module in cases of bulk or mass production requirements may be used such as dedicated printed circuit board (PCB) design. Antenna size is an element of LoRa signal range. The network communication module 122 includes a Bluetooth transceiver 212, a LoRa transceiver 214 and a GPS receiver 216. The Bluetooth transceiver 212, the LoRa transceiver 214 and the GPS receiver 216 are coupled with a microcontroller 220 that receives the communication data from each via a serial communication bus. The Bluetooth module 212 exchanges information with the respective infotainment module 132 via a Bluetooth link. A car dashboard/mobile device 232 and the Bluetooth module 212 of network module 122 are paired. This provides a dedicated connection between network module 122 and the infotainment device 132. Of course other short range communication protocols may be used instead of Bluetooth.

The infotainment module 132 may be a separate component such as a mobile device or it may be integrated HMI (human machine interface) in a vehicle dashboard. Of course other devices may have the capability to serve as the infotainment module 132. In this example, the infotainment module 132 includes a Bluetooth transceiver as part of the dashboard/mobile device 232 that exchanges Bluetooth communications with the Bluetooth module 212 of the network module 122. The infotainment module 132 also includes a GSM transceiver 234 for communication with the network 110. The infotainment module 132 includes a software application 236 that supports private group navigation.

Figure 3:
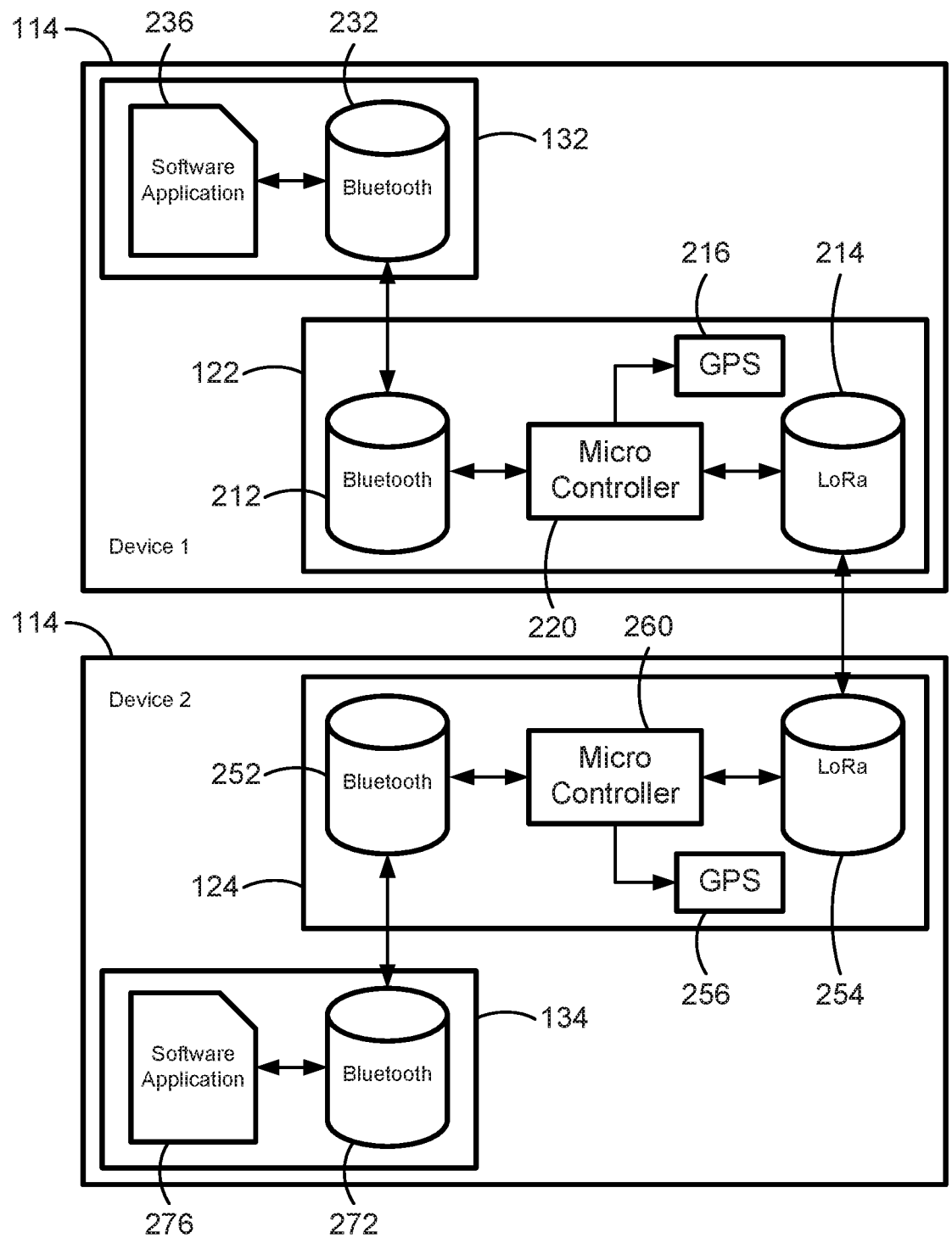
FIG. 3 is a flow diagram of the data communication between two devices on vehicles using the example system in FIG. 1.

FIG. 3 is a block diagram showing the data exchange between two group navigation devices 112 and 114 shown in FIG. 1. Similar to the group navigation device 112, the network communication module 124 of the group navigation device 114 includes a Bluetooth transceiver 252, a LoRa transceiver 254, and a GPS receiver 256. A microcontroller 260 controls the operation of the network communication 124. The infotainment module 134 includes a Bluetooth transceiver 272 and an application 276.

As shown in FIG. 3, the group navigation device 112 has direct communication with the group navigation device 114 via the connection between the respective LoRa transceivers 214 and 254. The LoRa network 120 is established by the group navigation devices 112 and 114. Connectivity between the group navigation devices is maintained by using the LoRa network 120 established for the group. Further, the information from each group navigation device, such as the group navigation devices 112 and 114, is pushed to the cloud 111 using Internet connectivity managed by the respective applications 236 and 276.

A back-and-forth data communication exists using the respective LoRa transceivers 214 and 254 and the respective network transceivers such as the GSM transceiver 234 in FIG. 2. The LoRa network is established by direct communications between the group navigation devices 112 and 114 via the LoRa transceivers 214 and 254 as shown in FIG. 3.

Data from each of the group navigation devices 112 and 114 may also be shared via the Internet connectivity to the cloud instance 111. This type of communication is not direct communication, rather the data is first sent via the Internet to the cloud 111 and then shared with the other group navigation devices. In other words, the navigation devices in the private group grab the information from the shared cloud instance. The hardware network module such as the network module 122 and the smart device or vehicle dashboard that constitutes the infotainment module 132 transfer data bi-directionally using Bluetooth. The modules 122 and 132 are paired using a Bluetooth connection. The smart device can be a vehicle dashboard application or a mobile application. The information from the device is pushed to the cloud 111 using the network transceiver 234.

Location of the user and members of the group is determined by the GPS receivers 216 and 256 on the group navigation devices 112 and 114. The respective GPS receivers 216 and 256 transfer location data to the Bluetooth transceivers 212 and 252 and the LoRa transceivers 214 and 254 via the microcontrollers 220 and 260. Location of the user and other group members and their relative positions are displayed on a map generated by the applications 236 and 276 in near real-time.

Figure 4B:
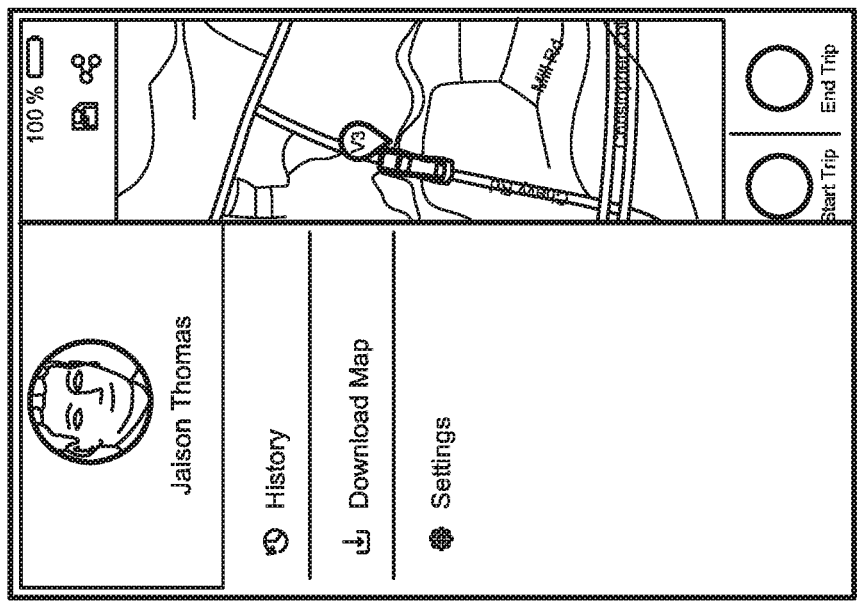
FIG. 4B is a screen image of menu items available via the interface in FIG. 4A.
Figure 4A:
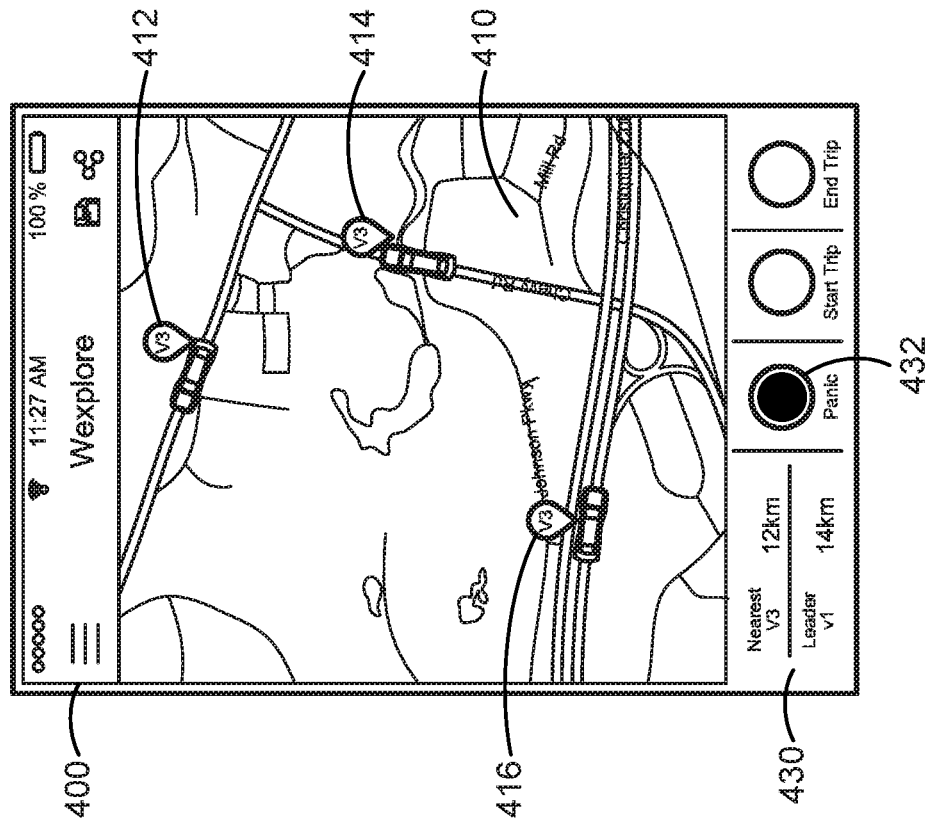
FIG. 4A is a screen image of an interface.

FIG. 4A is an example screen image (wireframe) of an interface display 400 that is generated by the application 276 on the infotainment module 134 for a user that is in a vehicle with the group navigation device 114. The interface display 400 shows a map 410 and different icons 412, 414, and 416. Each of the icons 412, 414, and 416 are associated with one of the group navigations devices 112, 114, and 116. The location of the icons 412, 414, and 416 on the map 410 reflect the current location of each of the vehicles in the group. The icon 414 that represents the vehicle associated with the group navigation device 114 that generates the interface 400 may be in a different color or have some other graphical indication. An information field 430 includes information on the other vehicles in the group associated with the group navigation devices 112 and 116. Such information may include the distance away each one is from the current location of the group navigation device 114. A "panic button" 432 is provided to allow a user to instantly alert all the members of the group that an emergency has occurred.

FIG. 4B is an example screen image 450 of an interface display 400 that can be generated by the application 276, which shows a menu 450 that allows the user to review his or her history, to download a map for offline viewing and manipulation, or to change settings for the application 276.

Figure 5:
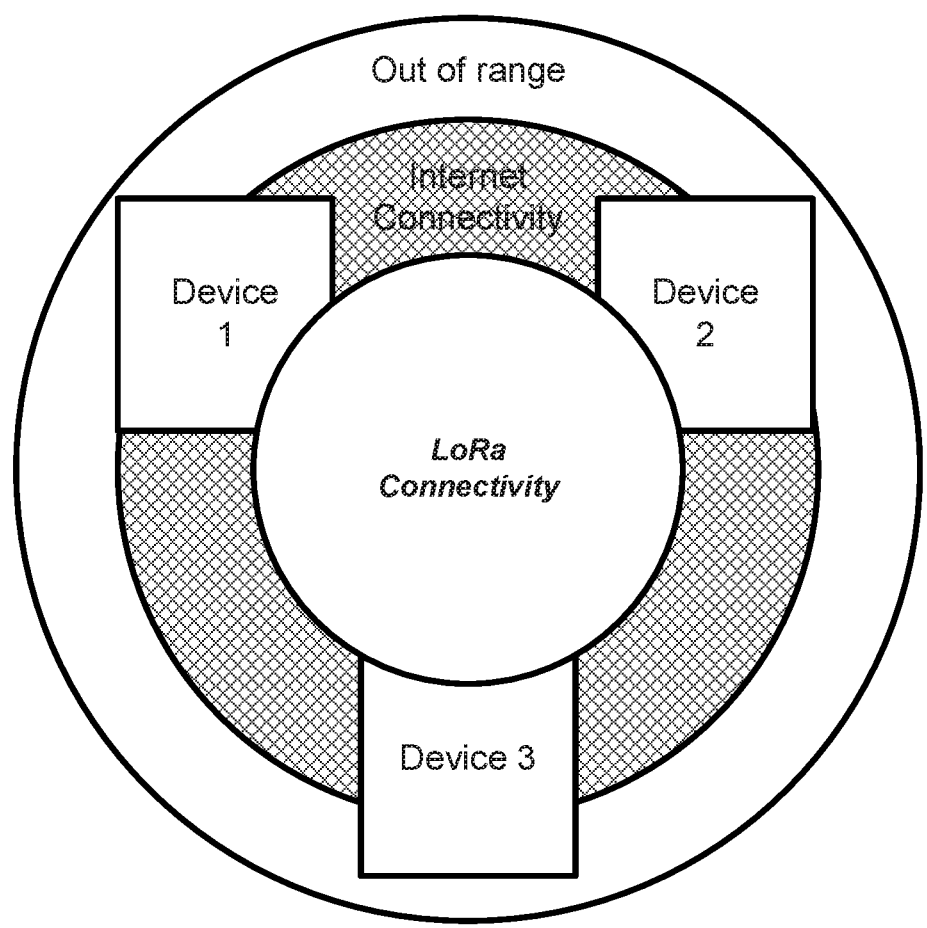
FIG. 5 is a diagram of the ranges of the cloud network and the private network established in FIG. 1.

FIG. 5 is a diagram of the ranges of the cloud network and the private network established in the system 100 in FIG. 1. LoRa connectivity is defined approximately by a radius that is smaller than a radius in which Internet connectivity is available, beyond which the devices fall out of range. When the devices are within LoRa connectivity range and LoRa is available, they communicate over LoRa and do not communicate using Internet connectivity. When one or more of the devices fall outside of LoRa range, they utilize Internet connectivity for communication. If the devices are within range of LoRa connectivity, but LoRa is not available, the devices communicate over the Internet.

The system 100 is based on an application that works in conjunction with several hardware modules, that facilitates effective map-oriented group travel whether by vehicle or on foot. The system 100 uses smart devices and/or vehicle built-in dashboard units for settings and user interfacing. All members of a group can view the route on a map, their own location on the map, the location of the group leader, and the locations, distances, and speeds of all group members relative to each other and to the destination. All of this information is constantly updated and displayed in real-time.

The principles of the system may also be used by a group traveling by foot or on a bicycle or other means of transport without using the LoRa network 120. When LoRa network is not used the group connectivity is maintained via the carried smart devices and the Internet. The network is provided by the mobile service provider. Alternatively, in the case of a group travelling on bicycles or other individual transport, the network module 126 can be easily attached to each bicycle. Carried hardware in the form of a handheld device or an attached device may be used for the LoRa network communication to support use cases like group jogging and group walking thus allowing the group members to use the full capabilities of the system 100. The LoRa capabilities could be included within the mobile device itself and no additional network communication modules will be required or otherwise the capabilities of the infotainment module 136 can be embedded into the network module 126 itself.

In this example, LoRa data packets are not compressed and therefore usual LoRa data packets would be used for transmitting the data between modules. In relation to network communications, data is more likely to be compressed but may depend on the application that handles network communications between different mobile travelers.

In relation to the LoRa network 120 established by the system 100 between the group navigation devices 112, 114, 116, the data rate of the LoRa communications is not as great as normal network communication such as that established by each of the group navigation devices 112, 114, and 116 with the Internet. However, with the LoRa network 120 the network modules on the devices, such as the network module 122, transmit the device ID, and the device preset location (fetched using the GPS receiver). Basic chat information may also be sent using the network communication modules.

Normal communication via the network modules such as the infotainment module 132 in FIG. 1, allow higher rates of data so chat, audio, video and images may be transmitted between the devices. However, during an Internet outage, such as a lack of signal in a remote area, the video and images cannot be sent to the cloud 111 or to any other devices. The LoRa network 120 between the group navigation devices carried by vehicles still allows data to be exchanged even with an Internet outage. Thus, the LoRa connection keeps the LoRa network 120 between the group navigation devices intact even in the Internet offline condition. The basic functionalities will be operational during an internet offline, LoRa live mode and therefore vehicle location may be exchanged between each of the group navigation devices.

The LoRa receiver for a group navigation device fetches the same set of information which is available in the bus coupled to the microcontroller. For example, the three group navigation devices 112, 114, and 116 may be in different locations, such as the respective vehicles being at different locations on a road. Thus, the device 112 is in location A, the device 114 is in location B, and the device 116 is in location C. The device 112 updates the information that it is in location A into the cloud 111 and into the LoRa network 120. The device 112 pushes the information into the cloud 111 using the internet 110 and at the same time throws the information into the LoRa network 120, which is operating on a particular frequency. The other devices 114 and 116 are also configured for the same cloud instance and LoRa frequency. The device 114 fetches the information from the cloud 111 and also receives the information through its LoRa transceiver 254.

The LoRa network 120, which works on a configurable frequency, transports the information that device 112 is in location A and provides the information to the LoRa transceiver 254 of the device 114. The device 114 checks the information in the cloud 111 regarding the location of device 112 and validates this information. This validated information is updated in the dashboard of the vehicle through the application 276 of the device 114. Alternatively, if the network device is a mobile device, the information may be updated in a visual display. This occurs when the same set of information is available in the LoRa network bus 120 and the cloud. Thus, the most valid and relevant data is used to plot the position of the device in the map 410 shown in FIG. 4.

The system 100 allows group members that possess the group navigation devices such as the group navigation device 112 to communicate using chat within the application. The system 100 creates a closed group consisting of the group navigation devices of the travelers that will be travelling in separate vehicles. Group members can alert all members of the group simultaneously in case of emergency (e.g., "group alert") via either the network modules or the infotainment modules. Route changes can be communicated to all members of the group in real-time. Routes can be saved and shared between the devices. The LoRa network is closed and secure. The group stays in contact using either the cloud 111 via the GSM network 110 or the LoRa network 120.

Connectivity between the devices within the network is maintained by using the LoRa network 120. The information from each device is pushed to the cloud using Internet connectivity. A back-and-forth communication exists using these two network protocols as is detailed in FIG. 3.

Two methods are used to facilitate communication among the group members. This can be done via the LoRa network 120 or via the Internet or GSM network 110 and cloud 111. The data collected from both sources are verified and logic is applied to determine which data source is closest to real time. The data is both recorded in the group navigation devices and shared across the group members via their respective group navigation device. When connected to the Internet group trip/travel data is pushed to the cloud by each of the group navigation devices. The closed network is predominantly created by the network communication modules on each of the group navigation devices. However, the closed network is capable of driving itself with Internet connectivity without the support of the LoRa network 120.

When Internet connectivity is available, the application checks if the information from LoRa or the information from the cloud is the most recent by comparing timestamps in the data messages. The most recent data is displayed in the application screen of each user. All the features of the application and network will work with either Internet or LoRa.

When Internet connectivity is not available, the software application saves all the information it receives in its hardware memory. This information is saved with the time stamp. The memory can be configured in such a way that the infotainment device 132 can hold information from many trips. The information will be pushed to the cloud once/when the internet connection is re-established.

If the LoRa network is unavailable then data from the Internet is used by the application. In this situation, group connectivity is maintained via the Internet (see FIG. 5). If the Internet is unavailable then data from the LoRa network is used, and group connectivity is maintained via LoRa.

The application is most useful in locations where there is no internet connectivity. As the vehicles or users are travelling to the same location at the same time there is a high probability that all the users will be in the near range of the LoRa network. The LoRa network, which works at a particular frequency for this closed group, thus maintains the group intact.

When Internet connection is unavailable the invention uses a local closed network based upon the LoRa protocols. The effective range of the LoRa network depends on the LoRa equipment used in the module, e.g., antenna size. In this example, the average range is 20 kilometers for the LoRa transceivers on the group navigation devices.

Should a member of the group go out-of-range of the LoRa network a message displays on each member's screen, for example, "group member <x> is out of LoRa range." A similar message can be displayed if a group member's device shuts off for any reason.

The data is stored by the smart device that may constitute the network module such as the infotainment module 132 in FIG. 1. Current smart devices support data up to a few gigabytes. For example, typical mobile phones have an internal memory of 64 GB and can support an additional 32 GB with an external memory card. The smart device has the capability to store trip information when the group navigation device is disconnected from the Internet. When the Internet connection is re-established, the application 236 automatically pushes the stored information back to the cloud 111.

In this example, data transfer to cloud servers that are part of the cloud 111 is accomplished via a specific URL(s) using GSM (Global System for Mobile Communications) connectivity. In this example, for each smart device constituting the network module in the group not more than 500 mb of data space is required for a group trip. When the data is sent to the cloud servers, the storage space in the smart device is cleared and reused. All data gathered by the modules and the application regarding speed, members of the group, chats, locations, route changes, etc., are stored in the cloud 111.

In this example, GSM protocol is used for the internet connection, Bluetooth is used for inter modular communication, Serial Communication (UART or SPI—depending on the microcontroller) is used for internal microcontroller communication. The LoRa protocol is used for establishing the LoRa Network 120. In this example, the LoRa data rate is 250 kbps.

The principles for the system 100 uses the LoRa network 120 (unless no network communication module is enabled, as with "on foot" group travel). Availability of the Internet does not affect the communication between group navigation devices when the LoRa network 120 is used.

The closed LoRa network 120 is created when the group navigation devices 112, 114, and 116 are configured/set up for the group trip. If the Internet connection/signal is "spotty" or stops there is no lag in application features or functions as the activity of the LoRa network 120 remains in place. The application on each of the group navigation devices such as the application 236, can alert the user if the Internet connection is lost, and that the group connectivity and application functions continue as expected. An entire group trip can be monitored with only the LoRa network 120 alone without any Internet connectivity.

In cases of interruptions of communication with the network, the system 100 uses the LoRa protocol as the essential core connection for the LoRa network 120. The information is exchanged using the LoRa network 120 between the group navigation devices 112, 114, and 116. Therefore, there is no requirement of "handoff" or latency for switching between communication channels should the Internet connection fail. The LoRa transceiver receives the LoRa packets from the created LoRa network. This function does not depend on the Internet and is therefore immune from internet connection failure.

As explained above, each device has both GSM connectivity and LoRa connectivity. The device-to-device information is exchanged using the LoRa network 120 as shown in FIG. 1. The information received by each device is placed in the cloud 111 using GSM connectivity. The cloud system validates and updates the latest and most relevant information in the cloud. If the device has outdated information it is updated in the infotainment module using the data from the cloud 111.

There are three instances of disruption to the system. First, LoRa connectivity may be lost by the device. The system 100 will still function as the GSM connectivity is live. Each device will update its information into the cloud using its GSM module. This information is fetched by the other group members' devices and thus the group remains intact.

Second, internet connectivity may be lost by a group navigation device. The system 100 will function based on the more limited data available from the LoRa network 120. The peer to peer information is collected by the LoRa network modules of the respective group navigation devices. As all the group navigation devices 112, 114, and 116 are connected using the LoRa network 120 the data will remain live and accurate.

When both internet and LoRa connectivity is lost to one of the group navigation devices, the particular device is lost. However, the other group navigation devices would continue to communicate through the LoRa network 120.

If any vehicle in the closed LoRa network 120 moves out of the LoRa range then that vehicle cannot be tracked. The user who has gone out of the range of the LoRa network 120 will see a notification that the group navigation device is out of range of the LoRa network.

For example, the three group navigation devices 112, 114 and 116 and their respective vehicles may be in different locations. If the group navigation device 116 is out of the LoRa network either due to failure or exceeding the range of the network, a color-coded notification that the device 116 is out of the LoRa network 120 is displayed in the dashboard of the vehicles carrying the devices 112 and 114.

If the internet connectivity is available for the group navigation device 116 then this information will be depicted in the dashboard with an internet-connected symbol on the other members of the group such as the group navigation devices 112 and 114. If both internet and LoRa connectivity are lost, then the group navigation device 116 will be marked as offline (or similar) and the place where the group navigation device 116 went offline is highlighted on the integrated map with a blinking alert. This is but one method by which this concept can be presented to the user. There can be more intuitive methods/icons to represent the information that may be developed.

Security of the data exchanged in the system 100 is ensured at the hardware level, communication protocol level, and cloud environment security controls. For security purposes the information from the microcontroller 220 can be encrypted using a SHE module (Secured Hardware Extension) present in the microcontroller. Another SHE module in the reception device decrypts information received from the group network 120. The LoRa data packets can also be encrypted. Data communication within the LoRa network 120 is based upon known and recognized encryption standards. Information shared through the application using the cloud has various layers of security that can be used. It is to be understood that the disclosed method of closed group travel may be made more secure by hardware as well as software methods.

Each network module such as the infotainment module 132 must be paired with the Bluetooth on the network module, such as the network module 122. For vehicle installation the in-vehicle infotainment module and the network module may be pre-configured. When using the system 100 based on a mobile device/smart phone as the infotainment module, the user must connect to the network module via Bluetooth. Bluetooth pairing occurs between the user's smart device and the infotainment module 132. This process can be automated for a pre-installed setup or can be manually done using the smart device application 236. The system 100 creates a closed community of travelers who desire to maintain a closed group. Thus, the system 100 may be used by a set of travelers who are travelling to the same destination in different vehicles.

For example, in the case of a dignitary visiting a remote location, the route map would be decided prior to the group travel. Several routes may be planned and only one route will be chosen. A lead car takes the route and other cars follow the lead vehicle. With the system 100, there is no requirement of radio-based coordination for the police forces who accompany the car occupied the dignitary. The system 100 creates a secured private group which has no access to any outside members or users. The cars using the system 100 will be updated as to the route and the location of the other cars. In case the dignitary's car is hijacked, the location information of the hijacked car is updated live in the dashboard of the security vehicles. This would help track and trap the hijacked car easily.

Even if the system 100 disconnects from the Internet the group remains connected and the closed network remains live. If the lead car changes the route or any vehicle in the group changes the route all the users will receive notification of the change on their screen. An emergency situation such as a car breaking down can be easily mitigated using the system 100 since all cars in the group are informed of the location of the other cars. The infotainment module and network module are independently powered. The power for the infotainment module is a pre-arranged setup. The power for the network module may be autonomous, or a chargeable or rechargeable battery can be used.

Figure 6:
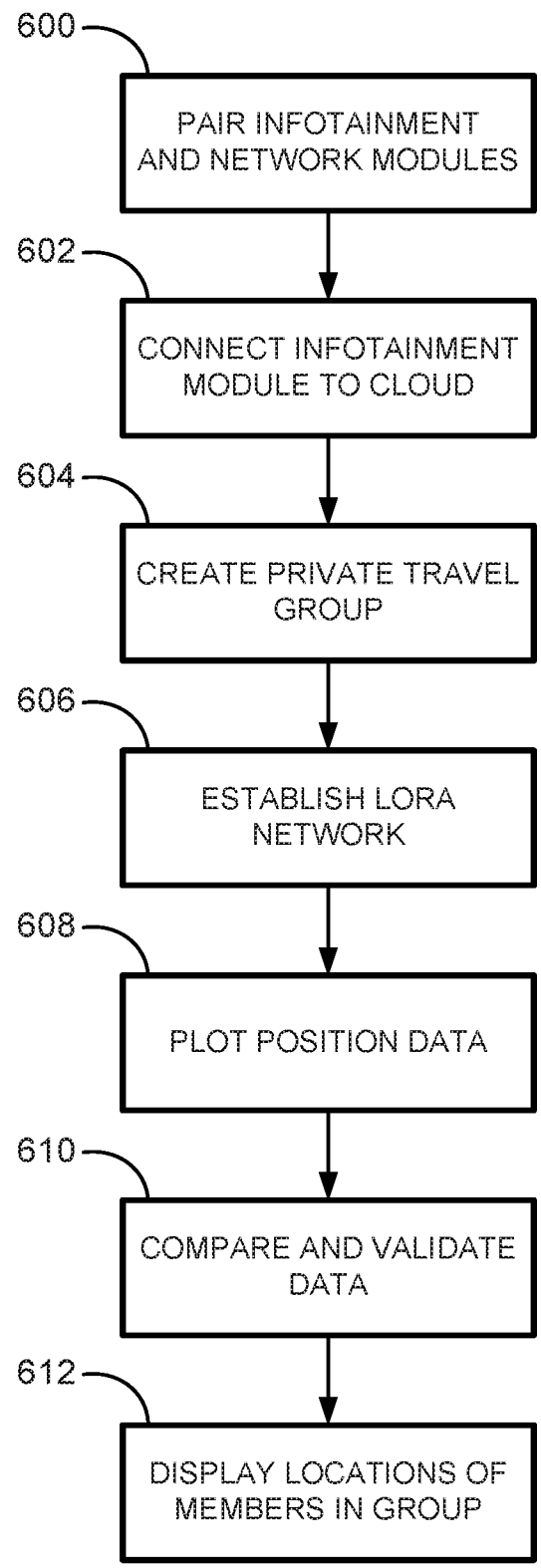
FIG. 6 is a flow diagram of the process of establishing a network between devices during travel.

FIG. 6 is a flow diagram of the software instructions executed by the system 100 in FIG. 1 to set up and operate the travel group. The flow diagram in FIG. 6 is representative of example machine readable instructions for the controllers in the devices in FIG. 1. In this example, the machine readable instructions comprise an algorithm for execution by: (a) a processor; (b) a controller; and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the interfaces can be implemented by software, hardware, and/or firmware. Also, some or all of the machine readable instructions represented by the flowchart of FIG. 6 may be implemented manually. Further, although the example algorithm is described with reference to the flowchart illustrated in FIG. 6, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The system 100 first pairs the Bluetooth connection between the infotainment module and the network module for each of the group navigation devices (600). Then the infotainment module is connected to the cloud 111 via a network such as the GSM network (602). Once the cloud connectivity is established, using the software application, a private travel group can be formed (604). The cloud software creates a LoRa frequency and creates a passcode. The software application, via the Bluetooth network, sets the LoRa frequency of the respective network module. Other devices connect to the cloud 111 using the group passcode and thus a closed travel group is formed. As the frequency is the same for all the group members the LoRa communication network is established (606). The device location of all the group members is plotted in the software application map (608). This information is validated against the information from the respective network modules (610). The location of all the members of the group are then displayed (612).

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A system for maintaining communication between a first and second traveler, the system comprising:
   a first group navigation module in proximity to the first traveler, the first group navigation module including a LoRa transceiver, a positioning receiver, a display, and a network communication transceiver;
   a second group navigation module in proximity to the second traveler, the second group navigation module including a LoRa transceiver, a positioning receiver, a display, and a network communication transceiver;
   wherein a LoRa network is established through the LoRa transceivers, and wherein position data from the positioning receivers is exchanged via the LoRa transceivers, and wherein the group navigation modules store the position data and uploads the stored position data via the network communication transceiver to an Internet connected network, wherein the network communication transceiver of the first group navigation module receives the position data of the second group navigation module from the Internet connected network, and validates the position data from the network with the position data received from the LoRa network; wherein the displays of the first and second group navigation modules each display a map and the location of the first and second group navigation modules on the map; and wherein the location of the second group navigation module on the display of the first group navigation module is based on the validated position data.

2. The system of claim 1, wherein the first and second travelers are in separate vehicles.

3. The system of claim 2, wherein the network communication transceivers are integrated in the vehicles.

4. The system of claim 1, wherein the network communication transceivers are integrated in respective mobile devices.

5. The system of claim 1, wherein the Internet connected network is a GSM network.

6. The system of claim 1, wherein the first group navigation module is alerted if the second group navigation module is beyond the range of the LoRa transceiver of the first group navigation module.

7. The system of claim 1, wherein the LoRa transceivers have a range over 10 km and a power under 20 dbM.

8. A method of communication between a first group navigation device and a second group navigation device during procession of the devices to a destination, the method comprising:

establishing a LoRa based network between the first and second group navigation devices via respective LoRa transceivers;

determining the position of each of the group navigation devices via a corresponding positioning receiver;

sending the position data associated with the position of the group navigation device to the other group navigation device via the LoRa network;

storing the position data associated with the position of the group navigation device in the corresponding group navigation device;

uploading the stored position data via a network communication transceiver in each group navigation device to an Internet connected network;

receiving the position data of the second group navigation module via the network communication transceiver of the first group navigation module from the Internet connected network;

validating the position data from the Internet connected network with the position data received from the LoRa network; and displaying a map and the location of the first and second group navigation modules on the map on a display of the group navigation devices, wherein the location of the second group navigation module on the display of the first group navigation is based on the validated position data.

9. The method of claim 8, wherein the first and second group navigation devices are in separate vehicles.

10. The method of claim 9, wherein the network communication transceivers are integrated in the vehicles.

11. The method of claim 8, wherein the network communication transceivers are integrated in respective mobile devices.

12. The method of claim 8, wherein the Internet connected network is a GSM network.

13. The method of claim 8, further comprising alerting the first group navigation module if the second group navigation module is beyond the range of the LoRa transceiver of the first group navigation module.

* * * * *